(12) United States Patent
Bertoli

(10) Patent No.: US 11,354,677 B2
(45) Date of Patent: Jun. 7, 2022

(54) AUTHENTICATION METHOD AND SYSTEM TO VERIFY THE AUTHENTICITY OF A PRODUCT

(71) Applicant: 1TRUEID S.R.L., Chiari (IT)

(72) Inventor: Emanuele Bertoli, CHIARI (IT)

(73) Assignee: 1TRUEID S.R.L., Chiari (IT)

( * ) Notice: Subject to any disclaimer, the term of this patent is extended or adjusted under 35 U.S.C. 154(b) by 656 days.

(21) Appl. No.: 15/481,959

(22) Filed: Apr. 7, 2017

(65) Prior Publication Data
US 2017/0293918 A1    Oct. 12, 2017

(30) Foreign Application Priority Data

Apr. 8, 2016   (IT) .................. 102016000036209

(51) Int. Cl.
| | | |
|---|---|---|
| *G06Q 30/00* | (2012.01) | |
| *G06Q 30/06* | (2012.01) | |
| *G06Q 50/00* | (2012.01) | |

(52) U.S. Cl.
CPC ....... *G06Q 30/0185* (2013.01); *G06Q 30/018* (2013.01); *G06Q 30/0609* (2013.01); *G06Q 50/01* (2013.01)

(58) Field of Classification Search
CPC .......................... G06Q 30/0185; G06Q 50/01
See application file for complete search history.

(56) References Cited

U.S. PATENT DOCUMENTS

| | | |
|---|---|---|
| 8,659,393 B2 | 2/2014 | Badillo |
| 9,047,499 B2 | 6/2015 | Bolouri-Saransar et al. |
| 10,091,650 B2 | 10/2018 | Ding et al. |
| 2008/0061935 A1* | 3/2008 | Melendez ................ H04B 5/02 340/10.1 |
| 2011/0032081 A1* | 2/2011 | Wild ..................... G06K 7/0008 340/10.42 |
| 2013/0320079 A1* | 12/2013 | Nordin ..................... G06K 5/00 235/375 |

(Continued)

FOREIGN PATENT DOCUMENTS

| | | |
|---|---|---|
| CN | 1584911 A | 2/2005 |
| CN | 101101637 A | 1/2008 |

(Continued)

*Primary Examiner* — John W Hayes
*Assistant Examiner* — Ari Shahabi
(74) *Attorney, Agent, or Firm* — Browdy and Niemark, PLLC

(57) ABSTRACT

Authentication method to verify the authenticity of products, including associating to each product an electronic identification device having a unique identification code, selecting at least one piece of product information suitable to describe the product, associating to each identification code at least one respective and unique encryption key, encrypting the identification code and the product information, storing the encrypted content in the memory of the electronic identification device, obtaining the identification code and the encrypted content from the electronic identification device, decrypting the encrypted identification code using the encryption key corresponding to the obtained identification code, in case of correspondence between the decrypted identification code and the obtained identification code, decrypting the encrypted product information using the encryption key.

9 Claims, 4 Drawing Sheets

(56) References Cited

U.S. PATENT DOCUMENTS

| | | | | |
|---|---|---|---|---|
| 2015/0055850 A1* | 2/2015 | Cazanas | ................ | G07D 7/004 |
| | | | | 382/135 |
| 2016/0027042 A1* | 1/2016 | Heeter | ............... | G06Q 30/0248 |
| | | | | 705/14.47 |
| 2018/0185741 A1* | 7/2018 | Shigeta | .................. | A63F 1/062 |

FOREIGN PATENT DOCUMENTS

| | | | |
|---|---|---|---|
| CN | 101369306 | A | 2/2009 |
| CN | 101882277 | A | 11/2010 |
| CN | 102595099 | A | 7/2012 |
| CN | 102663591 | A | 9/2012 |
| CN | 103019100 | A | 4/2013 |
| CN | 103150655 | A | 6/2013 |
| CN | 103985043 | A | 8/2014 |
| CN | 104239944 | A | 12/2014 |
| CN | 104346731 | A | 2/2015 |
| CN | 105009618 | A | 10/2015 |
| WO | 9904364 | A1 | 1/1999 |
| WO | 2012020291 | A2 | 2/2012 |

\* cited by examiner

AUTHENTICATION METHOD AND SYSTEM TO VERIFY THE AUTHENTICITY OF A PRODUCT

FIELD

The present invention relates to a method and a system for verifying the authenticity of products.

BACKGROUND

The increasingly widespread phenomenon of counterfeit goods, in particular garments and clothing accessories, beverages and food products, especially with Designation of Origin or Protected Geographical Indication, and furnishings (furniture, design objects, decorative items for the home, etc.) has prompted many manufacturers to equip themselves with systems able to verify if an article purchased by a customer, or displayed on the shelf, is original, i.e. actually comes from the manufacturer that the customer expects, or if it is a counterfeit article.

Among these systems, associating an article with an electronic label containing data which confirm the authenticity of the product and which may be checked by a mobile device owned by the purchaser, for example a smartphone or a tablet, to communicate these data is well known.

SUMMARY

The object of the present invention is to propose a product authentication method and a more secure and more effective system than known methods.

Another object of the invention is to propose a method and an authentication system that, in addition to being able to provide the purchaser of a product with secure information on the product's origin, is suitable for making an integrated system able to effectively counteract the phenomenon of counterfeiting.

A further object of the invention is to provide a method and an authentication system that, in addition to providing the purchaser of a product with secure information on the product's origin, also allows secure transactions to be made for such product.

A further object of the invention is to provide an authentication method and system that allow sharing of the product purchased through this system on the internet and on social networks, using proprietary or derivative systems (e.g. Facebook, Twitter, LinkedIn, Instagram, Google Plus, etc.), via smartphones or other wireless data reading means, including dedicated means.

Such objects are accomplished with an authentication method and with an authentication system. The dependent claims describe preferred embodiments of the invention.

BRIEF DESCRIPTION OF THE DRAWINGS

The features and advantages of the method and of the authentication system according to the invention will, however, become evident from the description hereinafter of the preferred embodiments thereof, provided by way of indicative and non-limiting examples, with reference to the accompanying figures, in which.

DETAILED DESCRIPTION

Figure 1:
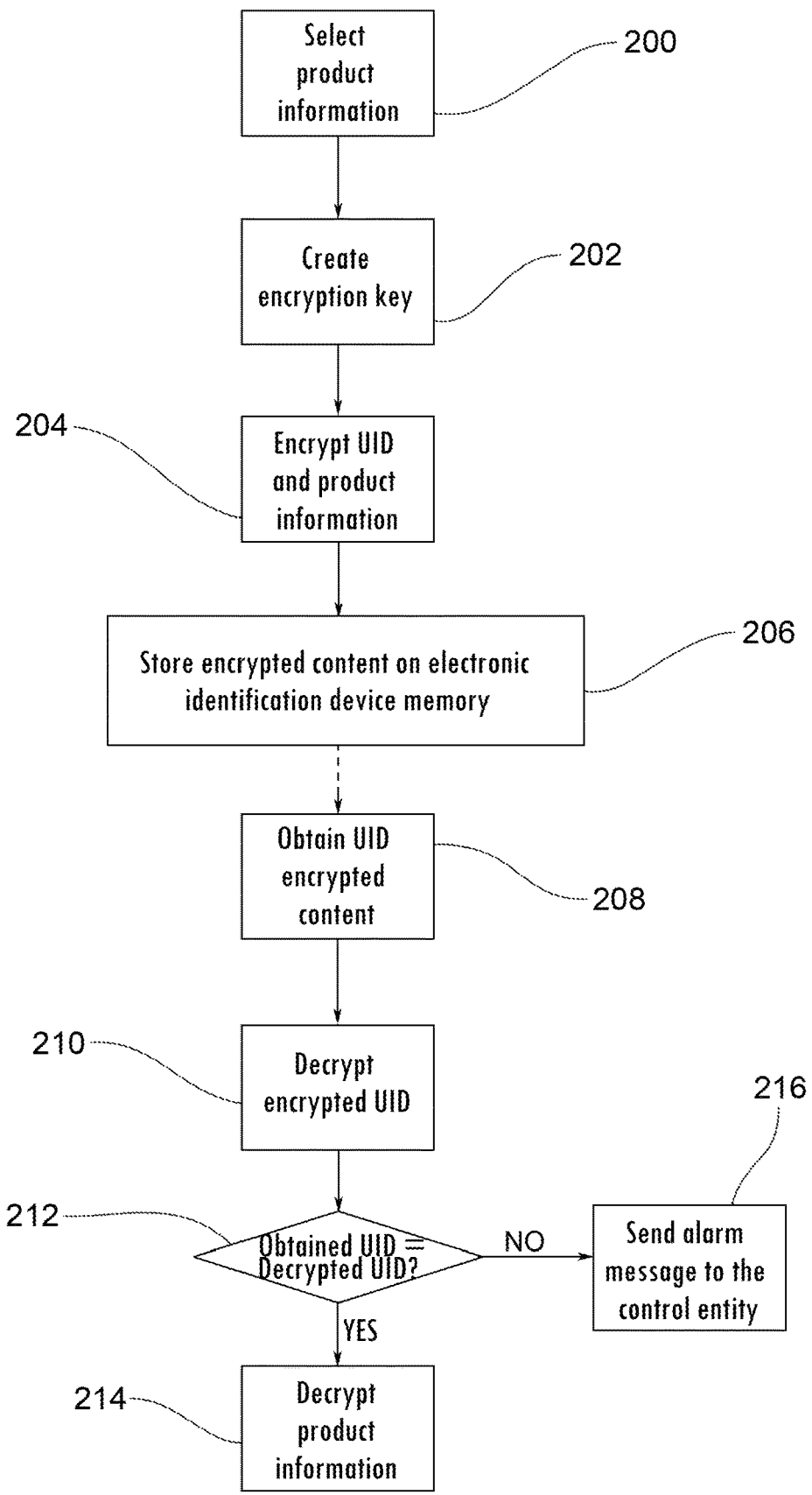
FIG. 1 is a block diagram of the authentication method according to the invention, in a general embodiment.
Figure 3:
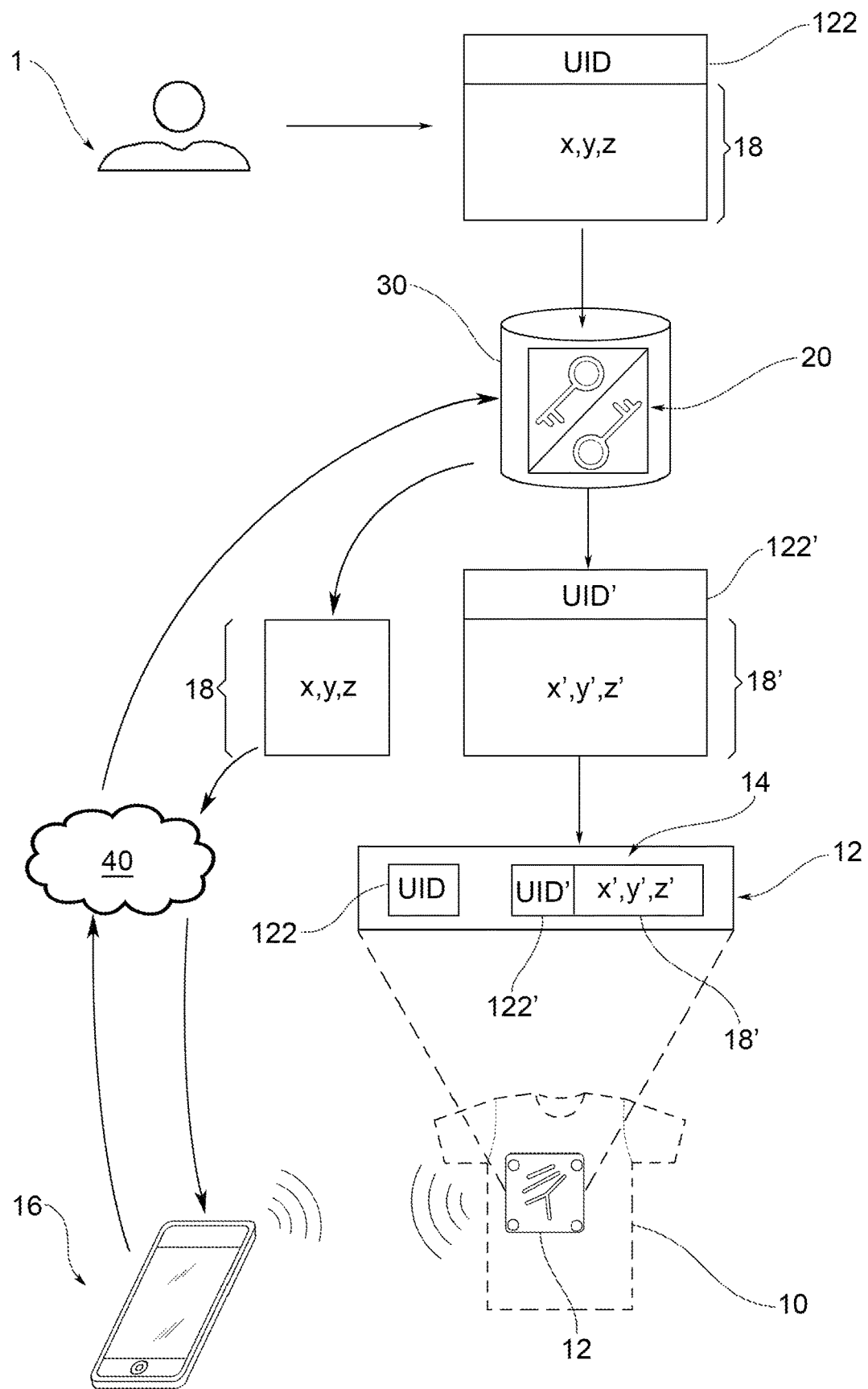
FIG. 3 is a schematic representation of the authentication system according to the invention, in one embodiment.
Figure 4:
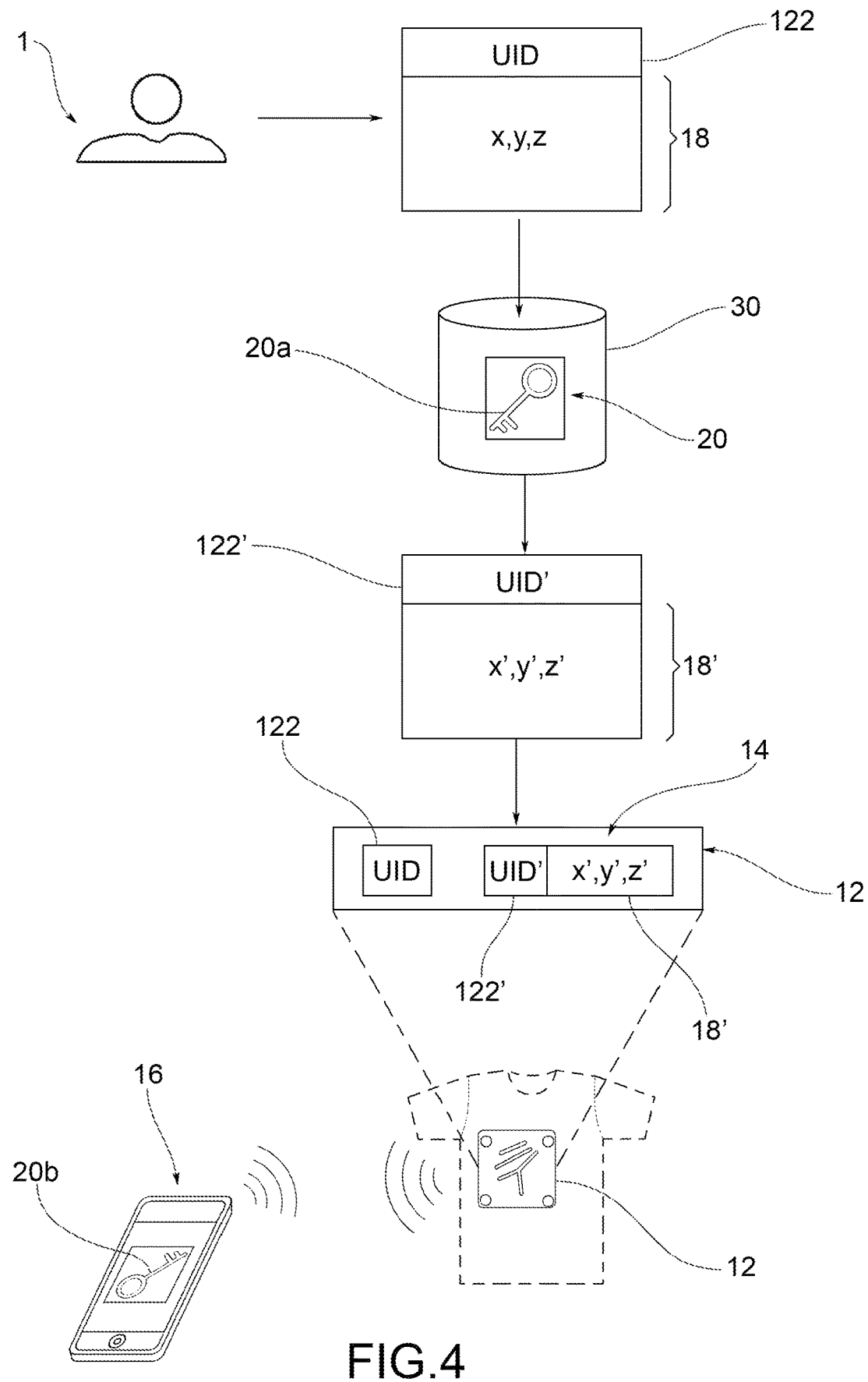
FIG. 4 is a schematic representation of the authentication system according to the invention in one variant of embodiment.

In accordance with a general embodiment and with reference to FIGS. 1, 3 and 4, the authentication method to verify the authenticity of products provides for associating to each product 10 an electronic identification device 12.

From the time of its production, the electronic identification device is uniquely identified by an identification code 122, in some embodiments known as a UID ("Unique IDentifier").

Each electronic identification device 12 is also provided with a memory 14, for example, an EEPROM, on which data may be written and from which data may be read.

Each electronic identification device 12 may furthermore be queried by a verification device 16 to transmit to such verification device 16 the identification code 122 mentioned above and the contents of the memory 14.

In other words, the electronic identification device 12 is any miniaturized electronic device associated with a product, able to store data and exchange such data with a device of a user or another entity making use of the product, suitable for establishing a communication with such miniaturized electronic device.

For example, the electronic identification device 12 is made in such a way as to be able to be interrogated in a wireless manner according to an RFID, NFC or other protocol.

The authentication method provides for selecting at least one piece of product information 18 suitable for describing the product that is to be authenticated (step 200 in FIG. 1).

Typically, this selection is made by the manufacturer or supplier of the product, indicated at 1 in the accompanying figures.

For example, the product information 18 may comprise a serial number or product registration number, a product code and/or a description of the features or qualities of a product. For example, in the case of an article of clothing 10, such description may specify the size and color of the article.

To each identification code 122, and therefore for each electronic identification device 12, at least one respective and unique encryption key 20 (step 202) is associated that will be used to encrypt the data of the electronic identification device 12, as will be described hereinafter.

Typically, the encryption keys 20 are held by an authentication entity that provides the authentication service to the manufacturer 1.

The identification code 122 and the product information 18 are encrypted with the encryption key 20 (step 204). Encrypted content 122'-18' associated with each electronic identification device 12 is thus obtained.

The encrypted content 122'-18' is stored in the memory 14 of the respective electronic identification device 12 (step 206).

The procedure described above therefore allows an electronic identification device 12 to be created and initialized for each product.

Hereinafter will be described the method of verifying the identity, and therefore authenticity, of the electronic identification device 12, and therefore the related product 10.

A verification device 16, for example, owned by a user who intends to purchase the product or by another entity making use of the object, obtains from the electronic identification device 12 the identification code 122 and the encrypted content 122'-18' (step 208).

Note that the identification code 122 of the electronic identification device is not usually subjected to confidentiality restrictions and is available to those who request it.

The encrypted identification code 122' is decrypted using the encryption key 20 that was created for the obtained identification code 122 (step 210).

Then, the data obtained by the decryption of the encrypted identification code 122' is compared to the obtained identification code 122 (step 212).

In the case of matching between the data obtained by the decryption of the encrypted identification code 122' and the obtained identification code 122, also the encrypted product information 18' is decrypted, always using the encryption key corresponding to the obtained identification code (step 214).

In this way, the user has verified the authenticity of the product and has obtained information about it.

It should be noted that the unencrypted identification code 122 allows the corresponding encryption key 20 to be retrieved and therefore the contents of the memory 14 to be decrypted. However, since the identification code 122 is accessible to all, this would not be sufficient to keep a counterfeiter from cloning the electronic identification device 12 and interfering with the memory 14, for example, by writing other information to it.

By writing to the memory of the electronic identification device also the encrypted identification code 122', the identity of the electronic identification device 12 may be verified with certainty. In fact, if the information contained in the portion of the memory reserved for the encrypted identification code 122', once decrypted using the encryption key, does not coincide with the unencrypted identification code 122 belonging to the electronic identification device 12, then this means that the electronic identification device has been cloned, and therefore the content of the remaining part of the memory 14 of the electronic identification device 12 is not obtained.

In one embodiment illustrated in FIGS. 3 and 4, the encryption keys 20 are created by an authentication entity and stored in a database of an authentication server 30 of this authentication entity.

In this case, the identification code 122 and the product information 18 is encrypted by the authentication entity.

Figure 2:
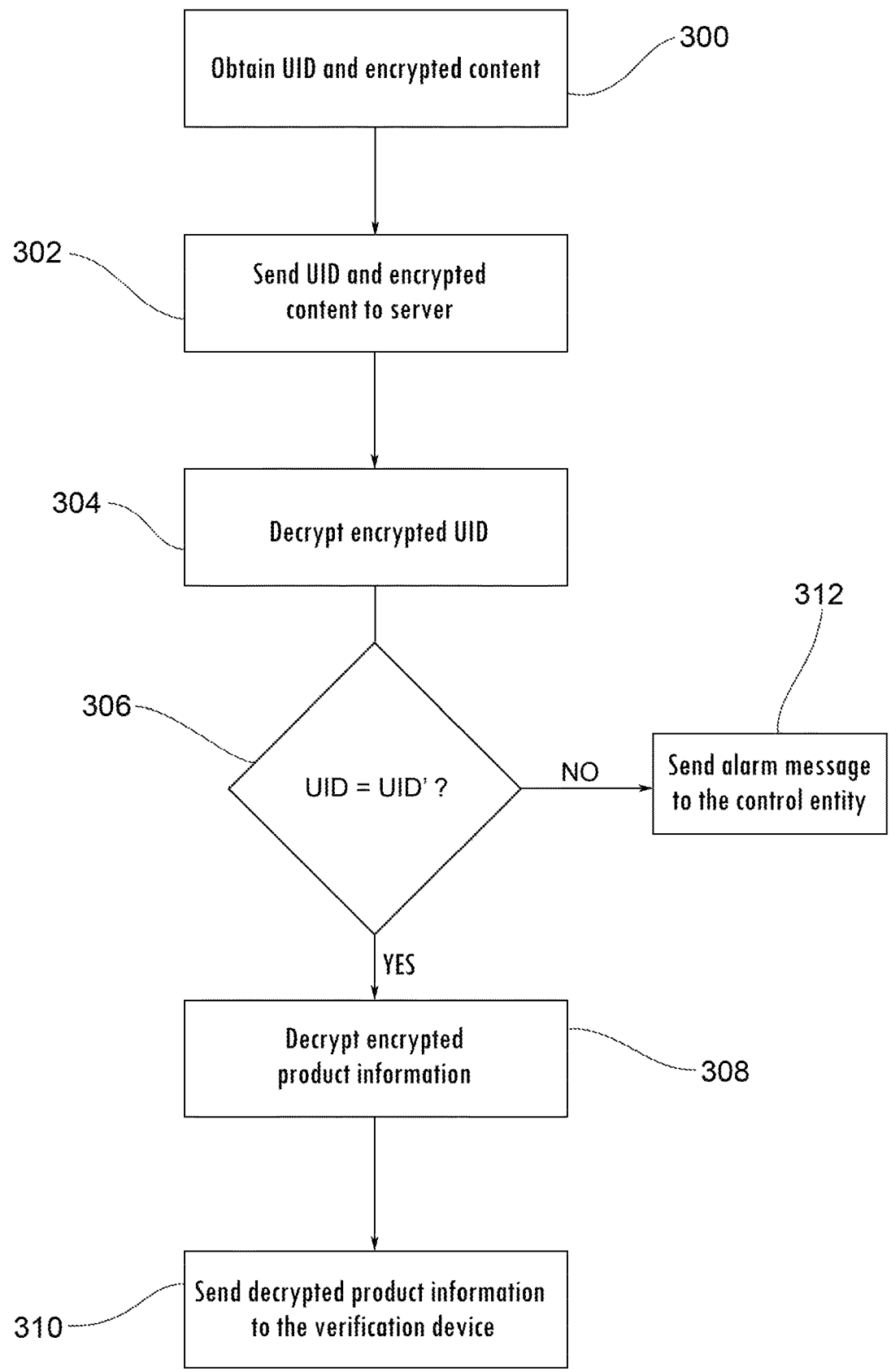
FIG. 2 is a block diagram of the identity verification part of the authentication method, in one embodiment.

In an embodiment illustrated in the diagrams of FIGS. 2 and 3, such authentication server 30 is also accessible to the verification device 16 to perform the operation of decrypting.

In this embodiment, the verification device 16 does not directly decrypt the encrypted content 18 of the memory 14, as it is not in possession of the encryption key 20. Instead, the verification device 16, after obtaining the electronic identification device 12, the identification code 122 and the encrypted content 18' from the memory 14 (step 300), transmits the data to the authentication server 30 (step 302).

The authentication server 30 retrieves the correct encryption key 20 according to the identification code 122 that it received from the verification device 16 and decrypts the information corresponding to the encrypted identification code 122' (step 304). It is therefore the authentication server 30 that verifies the identity of the electronic identification device 12 by comparing the unencrypted identification code 122 with the information contained in the portion of memory reserved for the encrypted identification code 122', once it is decrypted (step 306).

In the case of an authentic electronic identification device, the authentication server 30 proceeds with decrypting the information contained in the portion of the memory 14 containing the encrypted product information 18' (step 308) and returns the contents of the decrypted memory, and in particular the product information 18, to the verification device 16 (step 310).

This embodiment has the advantage that all encryption keys 20 are stored on a secure server, the server of the authentication entity 30, and must not be distributed to remote verification devices.

In one embodiment, for each product 10, and therefore for each electronic identification device 12, the authentication entity generates a pair of encryption keys 20, one public and one private.

The product information 18 and the identification code 122 are then encrypted and digitally signed by means of a mechanism with two encryption keys suitable for implementing an asymmetric encryption algorithm.

Furthermore, in one embodiment, the authentication server 30 that contains the encryption keys 20 is secured via two-step encryption.

Of course, in order to function properly, the authentication procedure described above requires the presence of a link, e.g. via the Internet 40, between the verification device 16 and the authentication server 30.

In one variant of embodiment illustrated in the diagram of FIG. 4, the authentication entity generates the keys 20a, 20b and encrypts the identification code and the product information.

However, the verification device is in possession of the encryption keys 20b or has access to the encryption keys 20b. In this way, it is the verification device 16 itself that may perform, in off-line mode, the verification of the authenticity of the electronic identification device 12, and therefore of the product 16.

Naturally, the verification device 16 must have access to as many encryption keys 20b as there are electronic tags 12.

This embodiment is therefore suitable for use particularly in applications where the verification device is a device dedicated to performing this function of controlling the authenticity of products, e.g., an electronic lock or an identification device, which for reasons of security are not connected to internal or external data networks.

In one embodiment, in which each identification code 122 is associated with a pair of keys 20a, 20b, the authentication server 30 uses a first key 20a of each pair of encryption keys, and the verification device 16 uses the second key 20b of each pair of encryption keys 20a, 20b.

In one embodiment, the product information 18 comprises sensitive data, for example the name of a subject that has commissioned a certain article. In this case, one may decide whether to also transmit these sensitive data to the user who made the request for authentication, e.g. according to the type of user.

For example, to each verification device is associated one of a plurality of security levels. Sensitive data decrypted by the authentication server may be transmitted to the verification device only if the verification device has a predetermined security level.

In one embodiment, it is possible to detect the spatial position wherein the reading of the electronic identification device and the sending of the detected spatial position to the authentication entity took place. This possibility is very useful in particular for knowing the location in which the counterfeiting of a product is detected.

For example, the detection of the spatial position takes place through the acquisition, by the authentication server, of the location data provided by a GPS receiver in the verification device.

In one embodiment, in the case of matching between the decrypted identification code and the identification code obtained by the verification device, an authentic product message comprising the product information is sent to the supplier of the product, e.g., for activating a warranty on the authenticated product.

In one embodiment, in case of a lack of correspondence between the decrypted identification code and the identification code obtained by the verification device, the verification device or the authentication entity sends an alarm message (steps 216; 312), possibly containing the spatial position detected, to a control entity's server.

In accordance with another aspect of the invention, the authentication method described above may also be used to carry out secure transactions for an object.

In particular, a user who owns the verification device 16, e.g. after registering with the authentication service 30, may use the verification device 16 to write encrypted user information to the memory 14 of the electronic identification device 12.

In one embodiment, the verification device 16 sends to the authentication server 30 the user information that the user wishes to write to the memory of the electronic identification device.

The authentication server 30 encrypts the user information and returns it to the verification device 16.

The latter may then proceed with writing the encrypted user information to the memory 14 of the electronic identification device 12.

In one variant of embodiment, in which the verification device is in possession of, or has access to, the encryption keys, it is the verification device itself that encrypts the user information.

For example, the user information is suitable to indicate the ownership of the object or other private or sensitive information.

In other words, the electronic identification device serves as the object registry or ownership registry.

The user may then use the authentication method according to the invention to transfer the ownership or the registration of an object.

Also object of the present invention is an authentication system to verify the authenticity of products which implements the authentication method described above.

In a general embodiment, the authentication system comprises an electronic identification device 12 associable to each product 10. As mentioned above, each electronic identification device 12 is uniquely identified by an identification code 122 and is provided with a memory 14 in which an encrypted content 122'-18' is stored.

This encrypted content 122'-18' comprises, in encrypted form, the identification code 122 and at least one piece of product information 18 suitable to describe the product.

Furthermore, each electronic identification device 12 is also suitable for being queried by a verification device 16 to transmit to such verification device the identification code 122 and the encrypted contents 122'-18'.

The system furthermore comprises encryption means that use a set of encryption keys 20, each uniquely associated to a respective identification code 122, to encrypt the identification code 122 and the product information 18.

In one embodiment, said encryption means are also suitable to write to the memory 14 of each electronic identification device 12 encrypted content comprising the encrypted identification code 122' and the encrypted product information 18'.

In one embodiment, each identification code 122 is associated with a pair of encryption keys 20 suitable to implement an asymmetric encryption algorithm.

The authentication system also comprises at least one verification device 16 suitable for querying the electronic identification device 12 to obtain from it the identification code 122 and the encrypted content 122'-18'.

For example, the verification device 16 is composed of a generic mobile device owned by a user, such as a smartphone or a tablet, equipped with software suitable for querying the electronic identification device 12 and to implement the authentication method described above.

In one variant of embodiment, the verification device 16 may be a device specifically dedicated to perform the function of controlling the identity of the electronic identification device, e.g. used by a control entity or by a store that sells products equipped with an electronic identification device, etc.

The authentication system further comprises decrypting means suitable for decrypting the encrypted identification code 122' using the encryption key 20 corresponding to the obtained identification code 122, verifying the correspondence between the decrypted identification code and the identification code obtained from the verification device, and decrypting the encrypted product information 18' using the encryption key 20.

In particular, the decrypting means comprise software able to extract from the memory 14 of the electronic identification device 12 the content portion that should correspond to the encrypted identification code 122' and, in case of correspondence between the obtained authentication code and such decrypted content portion, obtain and decrypt also the remaining content of the encrypted memory.

In one embodiment, the authentication system comprises an authentication server 30 provided with encryption means and decryption means. In this case, the verification device 16 is suitable to send to the authentication server the identification code 122 and the encrypted content 122'-18'. The decryption means are also suitable for returning the decrypted product information 18 to the verification device 16 (FIG. 3).

In one variant of embodiment, the authentication system comprises an authentication server 30 provided with encryption means (20*a*). The decryption means (20*b*) are installed on or accessible from the verification device 16.

In one embodiment, the verification device 16 is also configured to write an encrypted piece of user information to the memory 14 of the electronic identification device 12. The user information may be encrypted directly by the verification device 16, provided with encryption means, or by means of the authentication server 30, which receives the user information from the verification device, encrypts it, and returns it to the verification device to be written to the memory of the electronic identification device.

Regarding the electronic identification device 12, in one preferred embodiment, it has structural characteristics such that it may be used directly in traditional labels, buttons or other clothing accessories, loyalty cards, packaging, security seals for food and drinks, or attached to these or any other media.

The electronic identification device is also made in such a way as to be able to be subjected to or used in washing or industrial ironing processes (in the case of articles of clothing) or to be able to withstand heavy mechanical stress.

In the embodiments of the method and of the authentication system according to the invention, those skilled in the art may, to satisfy contingent needs, make modifications, adaptations and replacements of some elements with others that are functionally equivalent, without departing from the scope of the following claims. Each of the features described as belonging to a possible embodiment may be implemented independently by other described embodiments.

The invention claimed is:

1. An authentication method to verify the authenticity of at least one product of a plurality of products, comprising the steps of:
    (a) associating to each of said plurality of products a respective electronic identification device, each of said electronic identification devices comprising a memory storing an identification code that uniquely identifies said respective electronic identification device;
    (b) selecting at least one piece of product information that identifies the at least one product of the plurality of products that is to be authenticated;
    (c) associating to each identification code at least one unique encryption key;
    (d) encrypting each said identification code and each respective said at least one piece of product information using the respective at least one unique encryption key to yield encrypted content, wherein the respective at least one unique encryption keys are stored in a memory of an authentication server;
    (e) storing said encrypted content in the memory of the respective electronic identification device;
    (f) writing, by a verification device, user information encrypted content in the memory of each respective electronic identification device;
    (g) wherein the authentication server performs steps (c) to (e), and further performs the following steps:
        receiving from the verification device user information to be encrypted, the user information including a change in ownership of the at least one product of said plurality of products;
        encrypting the user information using the encryption key corresponding to the respective electronic identification device to yield the respective user information encrypted content; and
        returning the user information encrypted content to the verification device;
    (h) retrieving the stored identification code and the stored encrypted content from the respective electronic identification device by interrogating the respective electronic identification device using the verification device;
    (i) decrypting the encrypted identification code stored in the stored encrypted content using the encryption key corresponding to the retrieved identification code;
    (j) comparing the decrypted identification code and the retrieved identification code to one another;
    (k) when the comparison of the decrypted identification code and the retrieved identification code yields a match between the decrypted identification code and the retrieved identification code, decrypting the encrypted product information from the encrypted content using said encryption key corresponding to the respective electronic identification device; and
    (l) when the comparison of the decrypted identification code and the retrieved identification code does not yield a match between the decrypted identification code and the retrieved identification code, issuing an alarm message.

2. The method according to claim 1, wherein steps c) to e), i) and j) are carried out by the authentication server, wherein step i) is preceded by a step (h1) of sending the identification code and the encrypted content to the authentication server by the verification device and wherein step j) is followed by a step (j1) of returning the decrypted encrypted content to the verification device.

3. The method according to claim 1, wherein the step of associating to each identification code at least one respective and unique encryption key comprises associating each identification code to a pair of encryption keys configured and operable to implement an asymmetric encryption algorithm.

4. The method according to claim 1, wherein the at least one piece of product information comprises a serial number or registration number and a description of the product.

5. The method according to claim 2, further comprising the step of detecting a position where reading of the electronic identification device and sending of the detected position to the authentication entity took place.

6. The method according to claim 5, wherein the step of detecting of the position comprises obtaining, by the authentication server, location data from a GPS receiver of the verification device.

7. The method according to claim 1, further comprising interrogating, by the verification device, the electronic identification device using a wireless RFID, NFC, or Bluetooth protocol.

8. The method according to claim 1, wherein, when the comparison of the decrypted identification code and the retrieved identification code yields a match between the decrypted identification code and the retrieved identification code, sending an authentic product message comprising the at least one piece of product information to a supplier of a product of the plurality of products for activating a warranty on the product of the plurality of product.

9. The method according to claim 5, wherein, when the comparison of the decrypted identification code and the retrieved identification code does not yield a match between the decrypted identification code and the retrieved identification code, sending, by the verification device or the authentication entity the alarm message, wherein the alarm message contains the detected position, and is sent to a server of a control entity.

* * * * *